Figure 1:
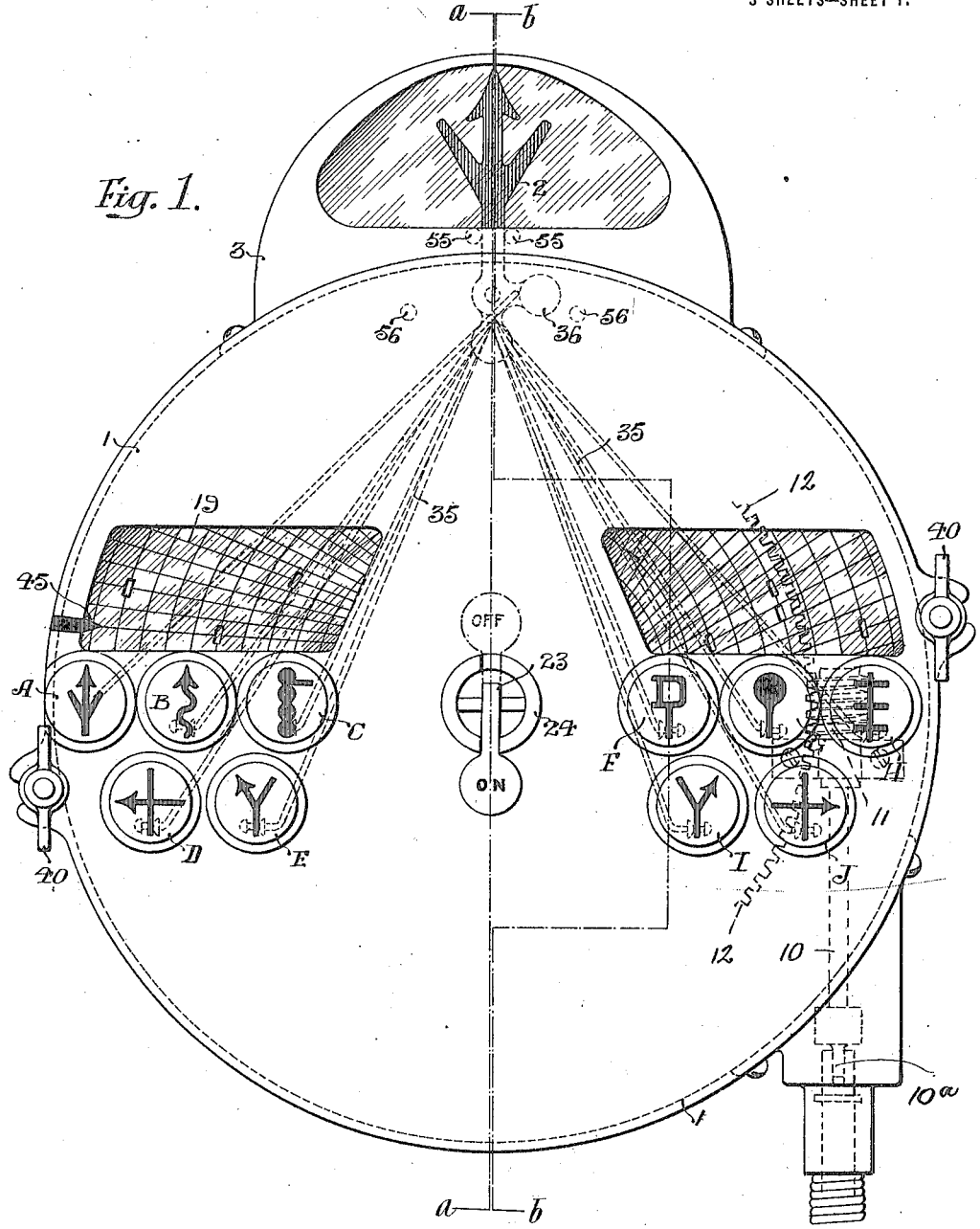

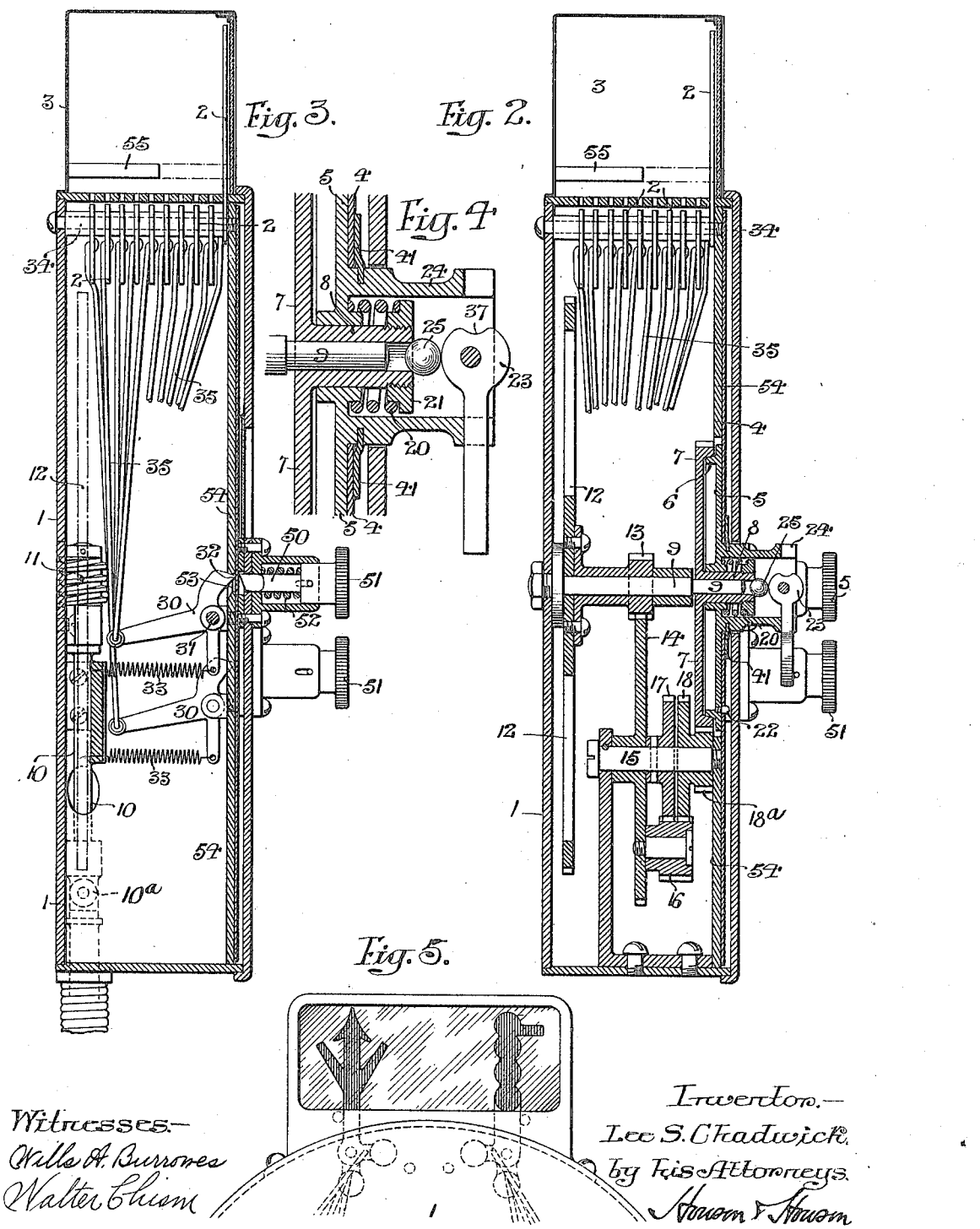

L. S. CHADWICK.
SIGNALING DEVICE.
APPLICATION FILED MAR. 17, 1910.

1,180,239. Patented Apr. 18, 1916.
3 SHEETS—SHEET 1.

L. S. CHADWICK.
SIGNALING DEVICE.
APPLICATION FILED MAR. 17, 1910.
1,180,239.
Patented Apr. 18, 1916.
3 SHEETS—SHEET 3.
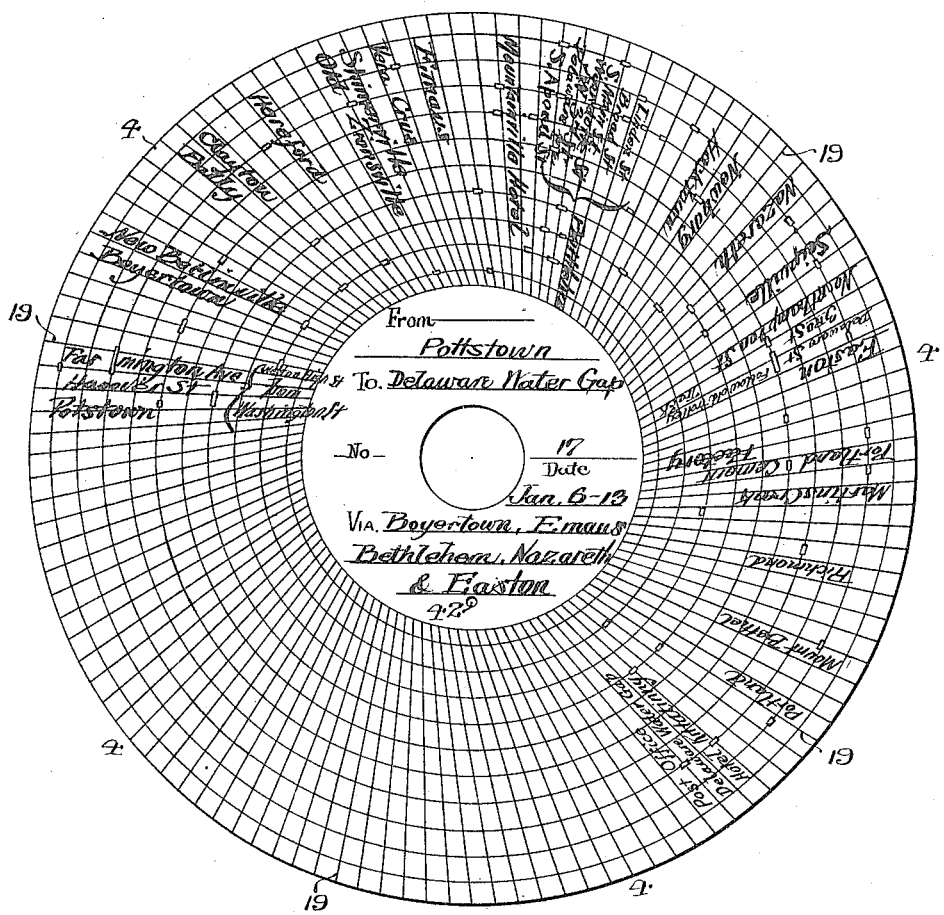
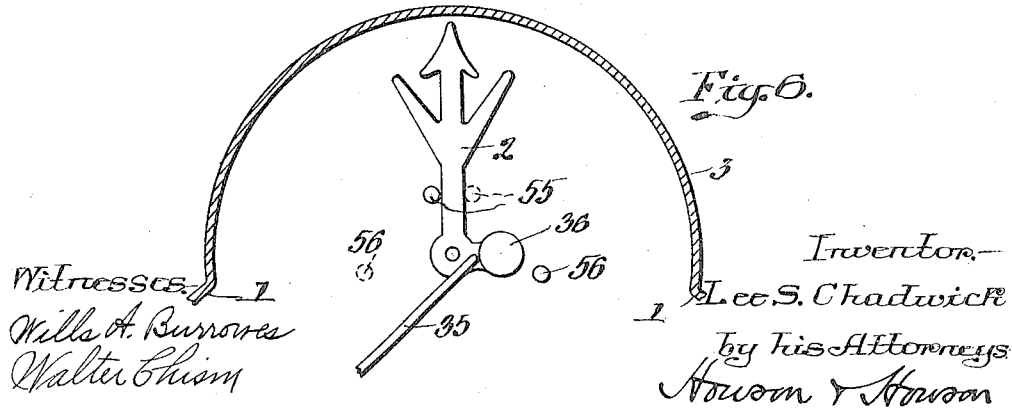

UNITED STATES PATENT OFFICE.

LEE S. CHADWICK, OF POTTSTOWN, PENNSYLVANIA.

SIGNALING DEVICE.

1,180,239.      Specification of Letters Patent.      Patented Apr. 18, 1916.

Application filed March 17, 1910. Serial No. 549,849.

*To all whom it may concern:*

Be it known that I, LEE S. CHADWICK, a citizen of the United States, and a resident of Pottstown, Montgomery county, Pennsylvania, have invented certain Improvements in Signaling Devices, of which the following is a specification.

My invention relates to signaling devices, and the object of my invention is to provide an automatic guide or signal for use on automobiles and other vehicles; such device being designed to render automobile touring easier and safer than is possible by the use of touring books or other devices.

The operating mechanism of my improved signaling device is arranged to be positively driven from one of the wheels of an automobile in a manner precisely similar to the driving of speedometers, odometers &c. Perforated records, which may consist of disk-shaped cards of any suitable material, are arranged to co-act with mechanism that will automatically display large direction signs or signals before the vision of the operator at intervals to indicate the character of the road, the direction to follow, or to give other information as to road or travel conditions; thereby permitting an automobile driver to make faster time, with the practically absolute certainty of being right and free from danger.

While the record card is employed in practice as the actuating element for mechanism that will display a visual or operate an audible signal or effect the operation of both; such visual signals being particularly desirable and being employed for all important directions, the use of the same can be augmented or elaborated by directions printed directly upon the face of the record card or sheet. The visual signals, however, are comparatively large, and the driver can see at a glance what is to be done.

As may be well understood, the signaling means forming the subject of my invention are far superior to any printed directions that have to be examined and selected while driving at speed, and when employed an operator does not have to rely upon his companions for road directions. These and other features of my invention are fully pointed out hereinafter, reference being had to the accompanying drawings, in which:

Figure 1, is a front elevation of one form of an automatic road guide or signaling device embodying my invention; Fig. 2, is a sectional elevation on the line *a—a*, Fig. 1; Fig. 3, is a sectional elevation on the line *b—b*, Fig. 1; Fig. 4, is an enlarged view of a portion of the structure illustrated in Fig. 2; Figs. 5 and 6, are views illustrating modifications within the scope of my invention, and Fig. 7, is a face view of a disk record employed with my improved guide or signaling device.

My improved structure comprises a suitable casing 1 containing mechanism for effecting the display of visual signals 2, which may be displayed in an auxiliary or supplemental casing 3 mounted on top of the main casing, although the supplemental casing may, in some instances, form part of the main casing, as shown in Fig. 6. In the present instance, the signals are arranged to be raised into view by the co-action of suitable mechanism designed to effect such result.

The mechanism for actuating the signals is controlled by and coacts with a perforated record card, which, in the structure illustrated in the drawings is in the form of a disk, indicated at 4. These card records are carried by a rotatable plate 5, forming one element of frictional clutching means whereby the card records may be rotatably driven, and having an engaging flange 6. The other element of the clutching means is carried by a gear wheel 7 having a hub 8 journaled on a centrally disposed shaft 9, and the plate 5 is journaled on said hub 8; the latter being turned to form a proper bearing for said plate. The gear wheel 7, which transmits its movement through said clutching means to the card record, is driven at a reduced speed by suitable mechanism hereinafter described which receives its motion from a wheel of the automobile through the use of a flexible shaft suitably connected to a worm shaft 10 having a worm 11 in engagement with a worm wheel 12 (which may have one hundred and fortyfour teeth) loose on said shaft 9. The flexible shaft is preferably attached to the worm shaft by means of a coupling 10ª, as shown in Figs. 1 and 3. The worm wheel 12 drives a pinion 13, which may be suitably connected to said wheel (and may have twelve teeth), which, in turn meshes with a gear wheel 14 (which may have seventy-two teeth) journaled on a shaft 15 suitably mounted in the casing of the structure. The gear wheel 14 carries a planetary pinion 16 (which may have twelve teeth) revolving around a non-moving gear wheel 17 (which may have thirty teeth) and driving a gear wheel 18 (which may have thirty-one teeth) one tooth for every revolution of the gear wheel 14. The gear wheels 17 and 18 are journaled on the shaft 15 and form the familiar paradox gearing. The gear 18 carries a pinion 18ª (which may have twelve teeth) and drives the gear 7 (which may have seventy-two teeth) of the clutching means, thus completing the gear reduction. It will be understood, however, that means for effecting the gear reduction may be arranged in many ways; the only point desired being to reduce the travel of the record card so that it will revolve once or substantially so for the distance represented by the tour, for instance, 100 or 150 miles, or convenient intermediate or lesser distances. In the present instance, the record card is arranged to revolve once in 120 miles, and is divided by the tangent lines 19 into spaces representing one mile, which spaces may be further sub-divided into tenths of a mile, if desired. The plate 5 may be held in engagement with the clutching face of the gear wheel 7 by a spring 20, surrounding the hub 8 of said gear wheel and interposed between said plate and a collar 21 mounted on the end of said hub. The driving plate 5 may carry a record-locating-pin 22 for the purpose of positioning and positively driving the record card. As the plate 5 is clutch engaged under the tension of the spring 20, in order that the movement of the record card can be started and stopped at will, I may provide a cam lever 23 suitably journaled in a sleeve 24 carried by the plate 5, said sleeve surrounding the hub 8 and the spring 20 and projecting through the casing cover as clearly illustrated in the drawings. Normally the clutch may be held in operative engagement by means of said spring 20. This cam, however, may be employed to separate the clutch faces should it be desired to stop the motion of the record card, and for this purpose the cam is moved to the position shown by dotted lines, Fig. 1. It will be seen, therefore, that by the use of this mechanism a tourist can, if he desires, leave the tour as originally outlined at any point; stopping the movement of the record card by raising the cam lever 23 to the dotted position. A tour may be picked up later at the point left, and the driving clutch may be thrown into action by proper movement of the cam lever. By this means also, a record card can be corrected at any time. Upon releasing the clutch by raising the cam lever, the record card can be turned either backward or forward, using said cam lever as a crank. This lever is preferably marked "On" at one side and "Off" on the other, as indicated in the drawings. Between the hub 8 and the cam lever I may interpose a ball 25.

The record card employed with my improved signaling device may be provided with apertures, perforations or other means for co-action with mechanism to operate or display the visual signals, and these perforations or other co-acting means are preferably disposed in concentric circles.

Mounted within the casing are a series of bell-crank-levers forming what I have termed "tracers." These levers are indicated at 30, being pivotally mounted at 31 and having ends 32 lying in contact with the record card. They are held in this position by light springs 33, the tendency of which is to hold said points 32 against the rear face of the record card and to effect further movement of the same when the perforated portions of said card are brought into registry with said tracers so that said points may enter said perforations.

In the upper portion of the casing of the structure illustrated herein, visual signals are displayed, indicated at 2 and journaled on a suitable shaft 34, and connected to the bell-crank-levers 30 by means of rods 35. These visual signals may be made of light material, colored or not, as the case may be, depending upon the character of the signals and the background afforded by the casing, and the movement of a tracer caused by its spring when the point enters a perforation of the record card is sufficient to actuate the rod connected thereto and move a visual signal to a vertical position for observance by the driver of the automobile. When the conditions indicated by the signal have been passed, the continued movement of the card pushes the tracer point out of the perforation, and such movement of the bell-crank-lever, through the rod described, throws the visual signal down; a movement that is assisted by a slight counterbalance weight 36 carried by said visual signal at one side of the pivot. This signal operating mechanism is the portion employed with the use of a previously made record card. It is, however, possible for the automobile driver to make records with the use of my improved road guide and signaling apparatus, such records being usually made when going over a new road that is to be subsequently traveled. In doing this, it will be necessary to insert a blank card for receiving the record. To insert such record card, the cam lever is thrown at right angles to the face of the casing, being retained in this position by a notch or groove 37, as shown, engaging the ball 25, and the cover of the casing, held on by a pair of thumb nuts 40 or other suitable fastening means which must be previously removed, is slipped off.

The record cards may be held to the driving plate 5 by a suitable spring clip 41, which must be removed, and then the card may be slipped over the clutch hub 8; the card being positioned with the aperture 42 in the same over the record-locating-pin. The holding spring is returned to position in engagement with the record card, the cover of the casing is replaced and tightened by the thumb nuts 40, and then the record card is revolved by means of the cam lever used as a crank until the starting point of the proposed tour comes opposite a pointer 45 at the left of the casing. When ready to start, the clutch is snapped into place by turning down the cam lever to show the word "On," and the operation of preparing a record can take place. It will be understood that a record previously made may be inserted in the casing in the same manner.

For the purpose of making records, I provide perforating or indenting means for the record cards comprising spring controlled punches 50 having buttons or keys 51 whereby they may be manually operated; such punches being automatically retracted by springs 52. The operating end of the punch is arranged to engage the record card opposite an aperture 53 in a suitable plate 54 secured to the casing in the same plane as the record driving plate 5 and behind the punches, whereby, in the case of cardboard or paper record cards, a clean aperture may be readily made, or, in the case of metallic record cards, an indentation may be made.

In the present instance, I have shown my apparatus as equipped with ten buttons or keys, controlling as many punches, and having different indicating marks on their faces corresponding to signals or indicators which may be brought into full view of the operator. These keys or buttons are indicated by the letters "A," "B," "C," "D," "E," "F," "G," "H," "I" and "J," and in the use of my improved road guide the table or index set forth at length in my Patent No. 1,002,368, dated September 5, 1911, (covering subject-matter divided from the present application), may be employed.

As shown herewith, the visual signals or signs are carried by a single shaft or spindle, and are movable to a position substantially central with respect to the supplemental casing. If desired, they may be mounted upon a plurality of spindles or shafts so that in making combinations, a plurality of signs or signals may be disposed side by side. In Fig. 5, I have shown a pair of shafts upon which the signals are journaled, so that for combination signals a pair may be displayed side by side, and in other instances arrangements may be made for displaying several signals side by side. To limit the extent of movement when raising and lowering the signals, I may provide stops as indicated at 55 and 56.

When making a record, the person making it would not want to work a button until he arrived at the place he wished to record and it would be obviously impossible to make fast or safe time in driving over country roads without having sufficient warning. The signals should preferably be thrown into view at least 1/5 mile before the change of direction or change in method of driving is desired. For that purpose the tracer is made so that it does not reach the top of the slot in the record card when the perforation is made. However, it will be seen that the tracer will drop into the perforation the next time the record card revolves as soon as the edge of perforation releases the tracer, thus allowing the signal to come up to view before the car arrives at the place for which the warning was given. By using wider punches and lowering the tracer warning can be given at least a mile ahead for change in direction; or if one desires, the record can be adjusted by revolving same to make the direction signs to be shown as clearly or as late as desired by the operator. It may be found advisable to advance the record a trifle for city driving so that the direction signs will be thrown up not over one block ahead of the turning point. The records can be easily set by revolving the same in either direction to suit the whim of the operator. The mechanism shown in the drawings allows for 1/5 mile advance.

Although I have described my improved signaling apparatus as particularly available for use with automobiles and in which the power to operate the same is transmitted from one of the wheels of the automobile in a manner similar to the operation of speedometers, odometers, and the like, it will be understood that it may be employed with vehicles of any character in which mechanism is arranged to operate in proper correlation with the distance traveled, with means for actuating such mechanism by movement of the vehicle upon which the apparatus is placed.

The structure shown in the drawings has been designed for use on the dash of the car in front of the driver. It will be understood, however, that indicators or signals of the same character can be employed at other points in the car.

No claim is made herein to the recording means or to the use of my improved signal structure as a recording device; the same being claimed in my Patent No. 1,002,368, dated September 5, 1911.

I claim:

1. In a road guide signaling device for automobiles, the combination of a casing, an apertured traveling element disposed within the same, means operated by the travel of the automobile for causing a proportional movement of said traveling element, visual signals pivotally mounted and arranged to be brought into view of the driver, bell crank levers actuated by said traveling element for operating said signals, means for keeping said levers under tension whereby they may operate to expose a signal when released by one of the apertures of the disk, a friction clutch interposed between said traveling element and its driving means, and means exterior of the casing for releasing said clutch, said means serving also to effect adjustment of said traveling element independently of its driving means.

2. A road guide signaling device for vehicles, comprising a casing, a plurality of movable signals pivotally mounted within the same, a power driven traveling element for controlling the actuation of said signals, said traveling element being mounted within the casing, means for effecting movement of said traveling element at a speed proportional to the rate of travel of the vehicle, and a cam lever mounted exterior of the casing and in operative engagement with a portion of said driving means for releasing the same from engagement with the traveling element, said lever serving also to effect adjustment of the traveling element without stopping the driving means therefor.

3. The combination, in a road guide signaling device for automobiles, of a casing, a movable record disk mounted therein, visual signals adapted to be displayed above said casing, said disk being apertured, bell-crank levers having portions under tension in contact with said disk and adapted to enter the apertures of the same, rods connecting said signals and the bell-crank levers whereby when the latter enter the apertures of the disk the tension means controlling said bell-crank levers will operate to expose the signals, a friction clutch adapted to control the movement of said record disk, and manually controlled means exterior of the casing for adjusting said record disk with respect to its driving means.

4. In a road guide signaling device for vehicles, the combination of a casing, a record element disposed therein, visual signals arranged to be brought into view of the operator, means controlled by said record element for exposing said signals, means for driving said record element, and a member carried exterior of the casing and in operative engagement with a portion of said driving means for releasing the same from engagement with the traveling element, said member serving also to effect adjustment of said record element independently of its driving means.

5. In a road guide signaling device for vehicles, the combination of a casing, a record element, visual signals arranged to be brought into view of the operator, means controlled by said record element for exposing said signals, means for driving said record element, disengaging means interposed between the driving means and the record element, and a disengaging member for said disengaging means mounted exterior of the casing for adjusting said record element.

6. In a road guide signaling device for automobiles, the combination of a casing, a rotatable disk carried therein, means for driving said disk at a speed proportional to the rate of travel of the automobile, visual signals arranged to be thrown into view of the driver, means for moving said signals, said disk being constructed to coöperate with and control the signal moving means, and a lever carried exterior of the casing and in operative engagement with a portion of said driving means for releasing the same from engagement with the traveling element, said lever serving also to effect adjustment of the rotatable disk independently of its driving means.

7. In a road guide signaling device for vehicles, the combination of a casing, a record element, a plurality of visual signals adapted to be exposed and operatively associated with said record element, means controlled by said record element for positively effecting the actuation of said signals to the exposed and non-exposed positions, means for driving said record element at a speed proportional to the rate of travel of the vehicle, disengaging means placed between the driving means and the record element, and a member for effecting such disengagement and adjusting said record element after it has been disengaged from the driving means.

8. In a road guide signaling device for vehicles, the combination of a casing, a record element adapted to be disposed therein, visual signals adapted to be actuated associated with said record element, means controlled by said record element for controlling the actuation of said signals, means for driving said record element at a speed proportional to the rate of travel of the vehicle, and means associated with said element and in operative engagement with said driving means for releasing the same from engagement with the traveling element, said releasing means serving also to effect adjustment of said record element independently of the driving means therefor.

9. In a road guide signaling device for automobiles, the combination of a casing, an apertured traveling record element disposed therein, means operated by the travel of the automobile for causing a proportional movement of said traveling element, visual signals adapted to be actuated associated with said record element and arranged to be exposed to the view of the driver, signal controlling tracers associated with and actuated by said traveling element, means for keeping said tracers under positive tension and in contact with said record element whereby they will operate to expose a signal when registry of said tracer with one of the apertures of the record element is effected, and means associated with said driving means for stopping or starting the record element without stopping or starting the driving means, said means serving also to adjust said record element to correct the time of signal exposure with relation to said driving means.

10. In a road guide signaling device for vehicles, the combination of a casing, a record element, visual signals arranged to be brought into view of the operator, means controlled by said record element for exposing said signals, means for driving said record element, and disengaging means interposed between the driving means and the record element, said disengaging means serving also to adjust said record element to cause earlier or later exposure of said signals independently of the driving means.

11. In a road guide signaling device for vehicles, the combination of a casing, a record element, a plurality of visual signals adapted to be exposed and operatively associated with said record element, means controlled by said record element for positively effecting the actuation of said signals to positions of exposure and non-exposure, means for driving said record element at a speed proportional to the rate of travel of the vehicle, and disengaging means placed between the driving means and the record element and including a member associated with and in operative engagement with said record element for controlling the time of signal exposure with relation to the driving means.

12. A road guide signaling device for vehicles, comprising a casing, a plurality of movable signals pivotally mounted within the same, a power driven traveling element for controlling the actuation of said signals, a mount for said traveling element journaled in the casing, means for effecting movement of said traveling element at a speed proportional to the rate of travel of the vehicle including a driven element clutched to said mount, and a cam lever mounted exterior of the casing and in operative engagement with said driven element for releasing the same from engagement with the mount carrying the traveling element, said lever serving also to effect adjustment of the traveling element without stopping the driving means therefor.

13. In a road guide signaling device for automobiles, the combination of a casing, a signal controlling traveling element carried therein, a mount for said traveling element, means for driving said element at a speed proportional to the rate of travel of the automobile including a driven element clutched to said mount, visual signals arranged to be exposed to the view of the driver, means for exposing said signals, said traveling element being constructed to co-operate with and control the signal exposing means, and a member disposed exterior of the casing in operative engagment with said driven element for releasing the same from engagement with the mount carrying the traveling element, said member serving also to effect adjustment of the traveling element independently of the driving means therefor.

14. In a road guide signaling device for vehicles, the combination of a casing, a record element disposed therein, visual signals arranged to be brought into view of the operator, means controlled by said record element for exposing said signals, means for driving said record element including a driven element clutched thereto, and a member carried exterior of the casing and in operative engagement with said driven element for releasing the same from engagement with the traveling element, said member serving also to effect adjustment of said record element independently of its driving means.

15. In a road guide signaling device for automobiles, the combination of a casing, a rotatable disk carried therein, means for driving said disk at a speed proportional to the rate of travel of the automobile including a driven member clutched to said disk, visual signals arranged to be thrown into view of the driver, means for moving said signals, said disk being constructed to co-operate with and control the signal moving means, and a lever carried exterior of the casing and in operative engagement with said driven member for releasing the same from engagement with the traveling element, said lever serving also to effect adjustment of the rotatable disk independently of its driving means.

16. In a road guide signaling device for vehicles, the combination of a casing, a record element adapted to be disposed therein, visual signals adapted to be actuated associated with said record element, means controlled by said record element for controlling the actuation of said signals, means for driving said record element at a speed proportional to the rate of travel of the vehicle including a driven member clutched to said record element, and means associated with said element and in operative engagement with said driven member for releasing the same from engagement with the record element, said releasing means serving also to effect adjustment of said record element independently of the driving means therefor.

In testimony whereof, I have signed my name to this specification, in the presence of two subscribing witnesses.

LEE S. CHADWICK.

Witnesses:
MURRAY C. BOYER,
WM. A. BARR.

Copies of this patent may be obtained for five cents each, by addressing the "Commissioner of Patents, Washington, D. C."